(12) United States Patent
Jang et al.

(10) Patent No.: US 9,799,904 B2
(45) Date of Patent: Oct. 24, 2017

(54) POLYMER ELECTROLYTE MEMBRANE FUEL CELL INCLUDING COMPLEX CATALYST AND METHOD FOR PRODUCING THE COMPLEX CATALYST

(71) Applicant: KOREA INSTITUTE OF SCIENCE AND TECHNOLOGY, Seoul (KR)

(72) Inventors: Jong Hyun Jang, Seoul (KR); Hee-young Park, Gyeongsangnam-do (KR); Hyoung-Juhn Kim, Gyeonggi-do (KR); Dirk Henkensmeier, Seoul (KR); Sung Pil Yoon, Gyeonggi-do (KR); Suk Woo Nam, Seoul (KR); Hyung Chul Ham, Seoul (KR); Tae-Hoon Lim, Seoul (KR); Jonghee Han, Seoul (KR); Sung Jong Yoo, Seoul (KR); Eun Ae Cho, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 271 days.

(21) Appl. No.: 14/016,687

(22) Filed: Sep. 3, 2013

(65) Prior Publication Data
US 2014/0315118 A1 Oct. 23, 2014

(30) Foreign Application Priority Data
Apr. 23, 2013 (KR) .......................... 10-2013-0044678

(51) Int. Cl.
H01M 8/10 (2016.01)
H01M 8/1004 (2016.01)
H01M 4/92 (2006.01)

(52) U.S. Cl.
CPC ......... *H01M 8/1004* (2013.01); *H01M 4/921* (2013.01); *H01M 4/923* (2013.01); *H01M 4/926* (2013.01); *Y02P 70/56* (2015.11)

(58) Field of Classification Search
CPC combination set(s) only.
See application file for complete search history.

(56) References Cited

U.S. PATENT DOCUMENTS

| | | | | |
|---|---|---|---|---|
| 2007/0218350 | A1* | 9/2007 | Alexandrovichserov | B01J 21/18 429/483 |
| 2009/0130526 | A1* | 5/2009 | Higami | C08G 61/02 429/524 |
| 2010/0255407 | A1* | 10/2010 | Kim | H01M 4/8821 429/494 |

\* cited by examiner

*Primary Examiner* — Jacob Marks
(74) *Attorney, Agent, or Firm* — Ladas & Parry LLP (57) ABSTRACT

A polymer electrolyte membrane fuel cell is provided. The polymer electrolyte membrane fuel cell includes a phosphoric acid-doped polyimidazole electrolyte membrane and a complex catalyst. In the complex catalyst, an alloy or mixture of a metal and a chalcogen element is supported on a carbon carrier. The polymer electrolyte membrane fuel cell exhibits further improved long-term operation, power generation efficiency, and operational stability at high temperature. The complex catalyst can be produced by a simple method.

2 Claims, 6 Drawing Sheets

(a) Ru/C, (b) RuSe$_{0.32}$/C, (c) RuSe$_{0.76}$/C, (d) RuSe$_{1.56}$/C

(a) Ru/C, (b) RuSe$_{0.32}$/C, (c) RuSe$_{0.76}$/C, (d) RuSe$_{1.56}$/C

(a) Ru/C, (b) RuSe$_{0.37}$/C, (c) RuSe$_{0.76}$/C, (d) RuSe$_{1.56}$/C

FIG. 6

POLYMER ELECTROLYTE MEMBRANE FUEL CELL INCLUDING COMPLEX CATALYST AND METHOD FOR PRODUCING THE COMPLEX CATALYST

CROSS-REFERENCE TO RELATED APPLICATIONS

This application claims priority under 35 U.S.C. §119 to Korean Patent Application 10-2013-0044678 filed on Apr. 23, 2013 in the Korean Intellectual Property Office, the disclosure of which is incorporated herein by reference in its entirety.

BACKGROUND OF THE INVENTION

1. Field of the Invention

The present invention relates to a polymer electrolyte membrane fuel cell (PEMFC) including a complex catalyst and a method for producing the complex catalyst. More specifically, the present invention relates to a polymer electrolyte membrane fuel cell including a complex catalyst whose catalytic activity is further enhanced even when the catalyst is poisoned by phosphoric acid, and a method for producing the complex catalyst.

2. Description of the Related Art

In recent years, new alternative energy sources to petroleum have attracted increasing attention as solutions to environmental pollution and energy depletion problems. Fuel cells using hydrogen or hydrocarbon fuels are considered the most promising means of alternative energy. Fuel cells are new power generation systems in which a fuel gas electrochemically reacts with an oxidant gas to create energy, which is directly converted into electrical energy. Considerable research efforts have concentrated on the development of fuel cells with higher energy efficiency and reliability.

Fuel cells are classified according to their structural features and operational environments. Representative examples of fuel cell types include molten carbonate type fuel cells (MCFCs), alkaline fuel cells (AFCs), solid oxide fuel cells (SOFCs), direct methanol fuel cells (DMFCs), and polymer electrolyte membrane fuel cells (PEMFCs).

Of these, polymer electrolyte membrane fuel cells (PEMFCs) are simpler in structure than other fuel cells and exhibit rapid start-up, fast response, and good durability. PEMFCs can use methanol or natural gas as a fuel other than hydrogen. Due to these advantages, the applicability of PEMFCs is extended to power sources of vehicles, distributed on-site power generation facilities, power sources for military use, power sources for spacecraft, and electric power for household use.

Such a PEMFC generates electricity based on the following mechanism. Hydrogen as a reaction gas is supplied from an anode. The hydrogen molecules are oxidized into hydrogen ions and electrons. The hydrogen ions are delivered to a cathode via a polymer electrolyte membrane. Oxygen molecules accept the electrons at the cathode. As a result of the reduction, the oxygen molecules are converted into oxygen ions. The oxygen ions react with the hydrogen ions moving from the anode and are converted into water molecules. Through such a series of reactions, a potential is created between the anode and the cathode to generate electricity. The series of reactions are schematically depicted below.

Anode: $H_2 \rightarrow 2H^+ + 2e^-$
Cathode: $1/2 O_2 + 2H^+ + 2e^- \rightarrow H_2O$
Overall cell reaction: $H_2 + 1/2 O_2 \rightarrow H_2O$ The cathode includes a catalyst that catalyzes the reduction of oxygen. Since a high temperature PEMFC using a phosphoric acid-doped polyimidazole electrolyte membrane has a mechanism that is not dependent on water, an operating environment of 100° C. or higher can be set. Therefore, the high temperature operating environment can at least overcome the phenomenon of cathode catalyst poisoning by carbon monoxide, which is a serious problem inherent to perfluorosulfonic acid (PFSA) polymer electrolyte membranes and Nafion membranes (DuPont) as commercially available products that are widely in use. This enables the use of various fuels such as reformed gases in the high temperature PEMFC.

In addition, the high temperature PEMFC can contribute to a reduction in the size of a system because the high temperature PEMFC can use compact reformer due to tolerance to CO poisoning, requires no humidifier and the like and is advantageous in waste heat utilization. However, phosphoric acid from the phosphoric acid-doped polyimidazole electrolyte membrane poisons the cathode catalyst. This catalyst poisoning was found to cause an increase in the amount of a noble metal catalyst such as platinum despite high operating temperature. Catalyst poisoning by phosphoric acid in the high temperature PEMFC using the phosphoric acid-doped polyimidazole electrolyte membrane is considered as the most urgent task to solve.

SUMMARY OF THE INVENTION

It is one object of the present invention to provide a polymer electrolyte membrane fuel cell which includes a complex catalyst whose catalytic activity is further enhanced even when the catalyst is poisoned by phosphoric acid and uses a phosphoric acid-doped polyimidazole electrolyte membrane to achieve further improved long-term operation and power generation efficiency.

It is another object of the present invention to provide a method for producing a complex catalyst with high catalytic activity for oxygen reduction and strong resistance to phosphoric acid poisoning.

According to one aspect of the present invention, there is provided a polymer electrolyte membrane fuel cell (PEMFC) including a phosphoric acid-doped polyimidazole electrolyte membrane and a complex catalyst wherein the complex catalyst includes a carbon carrier and an alloy or mixture of a metal and a chalcogen element supported on the carbon carrier.

In one embodiment of the present invention, the metal may be selected from the group consisting of ruthenium, platinum, osmium, palladium, iridium, and mixtures thereof.

In a further embodiment of the present invention, the chalcogen element may be selected from the group consisting of selenium, sulfur, polonium, tellurium, and mixtures thereof.

In another embodiment of the present invention, the carbon carrier may be made of VULCAN carbon, carbon nanotubes, fullerene, carbon narowires, porous carbon, carbon capsules, or a mixture thereof.

In another embodiment of the present invention, the metal may be ruthenium and the chalcogen element may be selenium.

In another embodiment of the present invention, the metal and the chalcogen element may be present in an atomic ratio of 1:1.50 to 1:1.60.

In another embodiment of the present invention, the complex catalyst may show a 17 to 64% increase in oxygen reduction catalytic activity after being adsorbed by phosphoric acid.

According to another aspect of the present invention, there is provided a method for producing a complex catalyst for a polymer electrolyte membrane fuel cell, the method including (a) adding a water soluble salt of a metal, a water soluble salt of a chalcogen element, and a carbon carrier to distilled water to prepare a dispersion, (b) adding a reducing agent to the dispersion and allowing the mixture to react, and (c) filtering the reaction product, followed by washing with water and drying.

The polymer electrolyte membrane fuel cell of the present invention exhibits further improved long-term operation, power generation efficiency, and operational stability at high temperature. The complex catalyst included in the polymer electrolyte membrane fuel cell of the present invention can be produced in a simple manner.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

A polymer electrolyte membrane fuel cell (PEMFC) of the present invention includes a phosphoric acid-doped polyimidazole electrolyte membrane and a complex catalyst wherein the complex catalyst includes a carbon carrier and an alloy or mixture of a metal and a chalcogen element supported on the carbon carrier.

The complex catalyst exhibits a marked increase in oxygen reduction catalytic activity when poisoned by phosphoric acid. In contrast, conventional complex catalysts show a decrease in catalytic activity when poisoned by phosphoric acid.

The constitution of the PEMFC according to the present invention will now be described in more detail.

The metal is one having a catalytic activity for oxygen reduction and is preferably selected from the group consisting of ruthenium, platinum, osmium, palladium, iridium, and mixtures thereof. Ruthenium is more preferably selected taking into account the production cost of the complex catalyst or sensitivity to phosphoric acid poisoning. Ruthenium can constitute a part of the complex catalyst in the most economical and efficient manner.

The chalcogen element is a material having a strong affinity for phosphoric acid and serves to weaken the binding energy between the metal and oxygen through the interaction with phosphoric acid, which eventually enhances the catalytic activity of the complex catalyst for oxygen reduction. The chalcogen element may be selected from the group consisting of selenium, sulfur, polonium, tellurium, and mixtures thereof. Selenium is more preferably selected taking into account the production cost of the complex catalyst or an affinity for phosphoric acid. Selenium can constitute a part of the complex catalyst in the most economical and efficient manner.

The weight or atomic ratio of the metal to the chalcogen element in the complex catalyst is not limited. Preferably, the metal and the chalcogen element are present in an atomic ratio of 1:0.20 to 1:2.0, more preferably 1:1.50 to 1:1.60. This atomic ratio can be easily adjusted within the range defined above by one skilled in the art who intends to reproduce or carry out the invention based on the following production method. The present inventors have discovered that the atomic ratio of 1:1.50 to 1:1.60 provides an optimum balance between the ability of the chalcogen element to adsorb phosphoric acid and the catalytic activity of the metal to maximize the catalytic performance of the complex catalyst.

The carbon carrier may be any of those known in the art and may be made of VULCAN carbon, carbon nanotubes, fullerene, carbon nanowires, porous carbon, carbon capsules, or a mixture thereof. The carbon carrier is not limited so long as it can support the metal/chalcogen element mixture or alloy and has a large surface area in contact with oxygen due to its porosity. That is, the carbon carrier is used for the purpose of allowing the complex catalyst to exhibit porosity. The metal and the chalcogen element may be supported on a carbon material other than the carbon materials specified above to produce a porous complex catalyst, which also falls within the scope of the present invention.

As described above, the activity of the complex catalyst for oxygen reduction is enhanced by phosphoric acid poisoning. Based on the foregoing principle, the complex catalyst may show a 17 to 64% increase in oxygen reduction catalytic activity after being adsorbed by phosphoric acid from the phosphoric acid-doped polyimidazole electrolyte membrane constituting the PEMFC of the present invention. A 64% increase in catalytic activity is observed when the atomic ratio of the metal to the chalcogen element is from 1:1.50 to 1:1.60, as explained earlier.

Now, an explanation will be given of a method for producing the complex catalyst for a PEMFC according to the present invention.

The method of the present invention includes a) adding a water soluble salt of a metal, a water soluble salt of a chalcogen element, and a carbon carrier to distilled water to prepare a dispersion, b) adding a reducing agent to the dispersion and allowing the mixture to react, and c) filtering the reaction product, followed by washing with water and drying.

The metal and the chalcogen element are the same as those described above. The chemical forms and physical properties of the water soluble salt of the metal and the water soluble salt of the chalcogen element are not limited so long as the metal and the chalcogen element can be dissolved in ionic forms in water. The water soluble salt of the metal and the water soluble salt of the chalcogen element are most preferably used in such amounts that the atomic ratio of the metal to the chalcogen element after dissolution is from 1:0.20 to 1:2.0, more preferably 1:1.50 to 1:1.60, as explained above. Ruthenium and selenium may be selected as the metal and the chalcogen element, respectively. In this case, the water soluble salts of the metal and the chalcogen element may be $RuCl_3$ and $SeO_2$, respectively.

The carbon carrier is selected from those described above. The carbon carrier may be any one that is dispersible in the form of a powder in water. The carbon carrier may be made of VULCAN carbon, carbon nanotubes, fullerene, carbon nanowires, porous carbon, carbon capsules, or a mixture thereof.

The reducing agent play roles in mediating chemical reactions between the metal, the chalcogen element and the carbon carrier in water and in firmly adsorbing or attaching the reactants to one another by redox reactions. There is no restriction as to the choice of the reducing agent so long as the roles of the reducing agent are fulfilled. The reducing agent may be sodium borohydride or sodium hydroxide, which is advantageous in terms of ease of reaction, price, and implementation of the subsequent washing.

Step a) includes adding the carbon carrier to distilled water, dispersing the mixture by sonication, and dissolving the water soluble salt of the metal and the water soluble salt of the chalcogen element in the dispersion. The sonication after addition of the carbon carrier is advantageous in producing the dispersion of the water insoluble carbon carrier. In addition, ions of the metal and the chalcogen dissolved in the dispersion are easily brought into contact with the carbon carrier. This is merely for illustrative purposes. For example, one skilled in the art who intends to reproduce or carry out the invention may simultaneously add the reactants to perform the reactions.

Step a) may further include heating the dispersion of the water soluble salt of the metal, the water soluble salt of the chalcogen element, and the carbon carrier. Preferably, the dispersion is heated in a reactor at 50 to 100° C. for 0.5 to 2 hours. The heating further increases the solubilities of the water soluble salts. The heating is performed for a time sufficient to further distribute the carbon carrier, the metal, and the chalcogen element in the dispersion.

Step b) is preferably carried out in an atmosphere protected from oxygen. Since the presence of oxygen, which is a highly oxidizing gas, may be a factor impeding the activity of the reducing agent in the method of the present invention, it is necessary to remove oxygen from the reactor. The oxygen removal may be performed in such a manner that at least one gas selected from the group consisting of helium, neon, argon, krypton, xenon, and radon is continuously fed into the reactor, which is common knowledge in the art.

The present invention will be explained in more detail with reference to the following examples. However, it will be appreciated by those skilled in the art that these examples are provided for illustrative purposes and are not intended to limit the scope of the invention.

EXAMPLE 1

Production of Complex Catalyst Including Ruthenium and Selenium in Atomic Ratio of 1:0.32

150 mL of triple distilled water and 0.1 g of a carbon carrier (VULCAN XC-72) were subjected to sonication in a reactor for 1 h to disperse the carbon carrier in the distilled water. To the dispersion were added 0.051 g of $RuCl_3$ and 0.009 g of $SeO_2$. The mixture was heated to 80° C. and kept at this temperature for 1 h. During heating, argon gas was allowed to flow at a rate of 200 cc/min to remove oxygen from the reactor. After 1 h, the mixture was cooled to room temperature. 20 mL of an aqueous solution of 0.204 g of $NaBH_4$ and 0.08 g of NaOH was added dropwise over 2 h while allowing argon gas to flow into the reactor. The resulting reaction product as a black precipitate was filtered, washed with 1 L of triple distilled water, and dried at room temperature for 24 h.

EXAMPLE 2

Production of Complex Catalyst Including Ruthenium and Selenium in Atomic Ratio of 1:0.76

A complex catalyst was produced in the same manner as in Example 1, except that 0.018 g of $SeO_2$ was used instead of 0.009 g of $SeO_2$.

EXAMPLE 3

Production of Complex Catalyst Including Ruthenium and Selenium in Atomic Ratio of 1:1.56

A complex catalyst was produced in the same manner as in Example 1, except that 0.036 g of $SeO_2$ was used instead of 0.009 g of $SeO_2$.

COMPARATIVE EXAMPLE 1

Production of Complex Catalyst Including Ruthenium and Carbon Carrier

A complex catalyst was produced in the same manner as in Example 1, except that $SeO_2$ was not added.

EXAMPLES 4-6 AND COMPARATIVE EXAMPLE 2

Half Cell Experiments Using a Three-Electrode Arrangement

Home-made PBI/PA membranes were used as electrolytes. Pt/C was used as an anode catalyst. Anhydrous $H_2$ and $O_2$ gases were supplied to anodes (52 mL/min) and cathodes (198 mL/min), respectively. A half cell experiments using a complex catalyst of Example 1 in the working electrode (Example 4), a half cell experiments using a complex catalyst of Example 2 in the working electrode (Example 5), a half cell experiments using a complex catalyst of Example 3 in the working electrode (Example 6), and a half cell experiments using a complex catalyst of Comparative Example 1 in the working electrode (Comparative Example 2) were fabricated. In the test examples that follow, the complex catalyst of Example 1 and the half cell experiments of Example 4, the complex catalyst of Example 2 and the half cell experiments of Example 5, the complex catalyst of Example 3 and the half cell experiments of Example 6, and the complex catalyst of Comparative Example 1 and the half cell experiments of Comparative Example 2 are collectively referred to as "$RuSe_{0.32}/C$", "$RuSe_{0.76}/C$", "$RuSe_{1.56}/C$", and "Ru/C", respectively.

Test Tools and Settings

Transmission electron microscopy: Images were taken using a transmission electron microscope (F-20, TECNAI). At this time, electrons were accelerated at a voltage of 200 kV. A specimen was constructed by dropping an ink of each of the catalysts of Examples 1-3 and Comparative Example 1 dispersed in ethanol onto a copper grid coated with a polymer film, and drying the ink in a vacuum oven at 40° C. for 12 h.

X-ray diffraction: X-ray diffraction patterns of the catalysts of Examples 1-3 and Comparative Example 1 were measured using an X-ray diffractometer (MiniFlex II, RIGAKU) at a rate of 0.1°/min in θ-2θ scan mode.

Energy dispersive X-ray spectroscopy: Energy dispersive X-ray spectra of the catalysts of Examples 1 to 3 and Comparative Example 1 were recorded on a transmission electron microscope (F-20, TECNAI). At this time, electrons were accelerated at a voltage of 200 kV.

X-ray photoelectron spectroscopy: X-ray photoelectron spectra of the catalysts of Examples 1 to 3 and Comparative Example 1 were obtained using an X-ray photoelectron spectrometer (PHI 5000 VersaProbe, Ulvac-PHI). The energy of the X-ray photoelectron spectra was calibrated based on the energy of C 1S. The areas of the spectra were calculated using the XPSPEAK program to determine the compositions of the catalysts.

Cyclic voltammetry: Cyclic voltammograms of half cell experiments using a three-electrode arrangement in Examples 4-6 and Comparative Example 2 were obtained using an AUTOLAB potentiostat (ECO CHEMIE). The cyclic voltammograms were obtained through half-cell experiments using a three-electrode arrangement with a catalyst layer-deposited amorphous carbon working electrode, a calomel reference electrode, and a platinum wire counter electrode. A 0.1 M aqueous perchloric acid solution or an aqueous solution of 0.1 M perchloric acid and 10 mM phosphoric acid was used as an electrolyte. The temperature was 20° C. The potential range was 0-1 V (vs. NHE) and the potential scan rate was 20 mV/s.

Oxygen reduction polarization test: Oxygen reduction polarization of half cell experiments using a three-electrode arrangement in Examples 4-6 and Comparative Example 2 was measured using a rotating disk electrode (RDE, ECO CHEMIE) in an oxygen-saturated 0.1 M aqueous perchloric acid solution or an aqueous solution of 0.1 M perchloric acid and 10 mM phosphoric acid. Oxygen reduction polarization curves were measured by cyclic voltammetry. The rate of rotation of the RDE was 1600 rpm, the measurement temperature was 20° C., the potential range was 0.2-1.0 V (vs. NHE), and the potential sweep rate was 20 mV/s.

Current density and half-wave potential measurements: Current densities and half-wave potentials were obtained from the oxygen reduction polarization curves. The current density was obtained from the kinetic current density calculated using the Koutechy-Levich equation in the corresponding oxygen reduction polarization curve. The half-wave potential was obtained by determining a potential point where the current is half the diffusion limiting current obtained from the corresponding oxygen reduction polarization curve.

X-ray absorption spectroscopy: X-ray absorption spectroscopy analysis of the half cell experiments using a three-electrode arrangement of Examples 4-6 and Comparative Example 2 was conducted using 10 C beam line at the Pohang Accelerator Laboratory. The electron beam was operated in a decay mode at 2.5 GeV and 150-100 mA. X-ray absorption spectra were obtained using a fluorescence spectrometer. In-situ X-ray absorption spectroscopy analysis was performed in a state in which the voltage of a working electrode was controlled using a dedicated electrochemical cell.

TEST EXAMPLE 1

Micrographs of the Complex Catalysts

Figure 1:
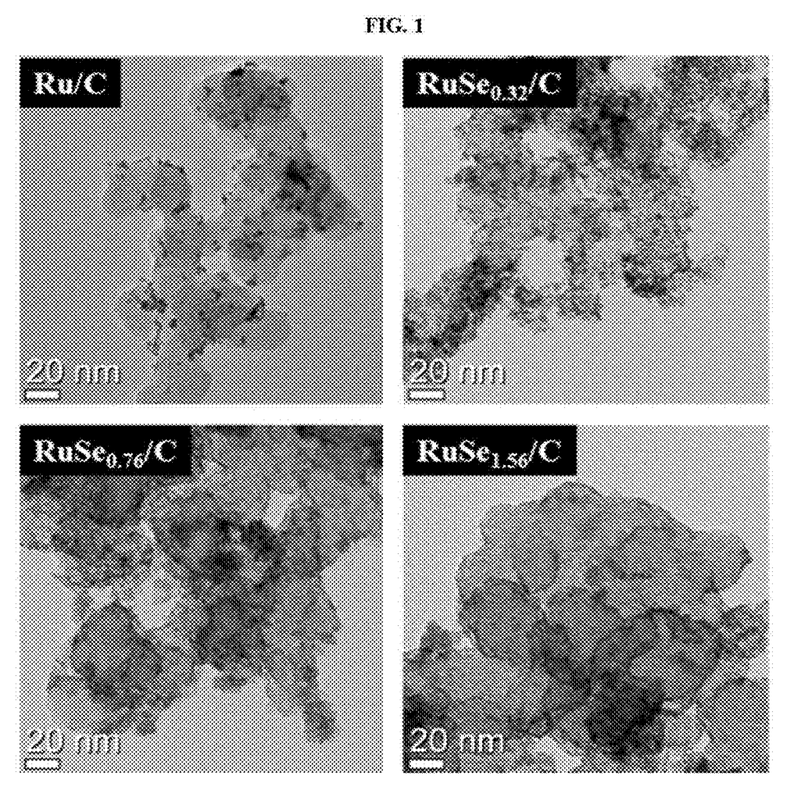
FIG. 1 shows transmission electron micrographs of complex catalysts produced in Examples 1 to 3 and Comparative Example 1.

FIG. 1 shows transmission electron microscopy (TEM) images of $RuSe_{0.32}/C$ (Example 1), $RuSe_{0.76}/C$ (Example 2), $RuSe_{1.56}/C$ (Example 3), and Ru/C (Comparative Example 1). As shown in FIG. 1, it can be observed that the number of amorphous particles is noticeably increased with increasing content of the selenium atoms in the complex catalysts.

TEST EXAMPLE 2

X-ray Diffraction (XRD) Discussion

Figure 2:
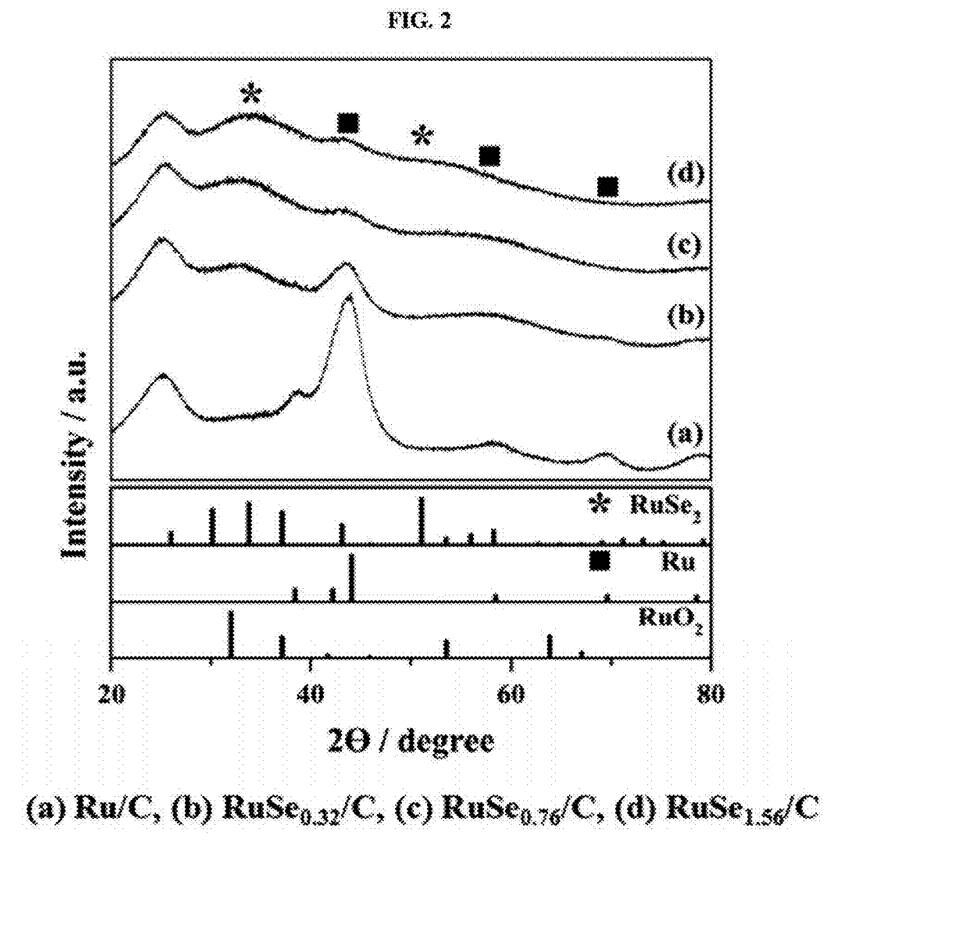
FIG. 2 shows X-ray diffraction (XRD) patterns of complex catalysts produced in Examples 1 to 3 and Comparative Example 1.

FIG. 2 shows X-ray diffraction (XRD) patterns $RuSe_{0.32}/C$, $RuSe_{0.78}/C$, $RuSe_{1.56}/C$, and Ru/C. The XRD pattern of Ru/C, shows a typical Ruhcp structure. After annealing and peak deconvolution, the $RuSe_y/C$ samples ($RuSe_{0.32}/C$, $RuSe_{0.78}/C$, and $RuSe_{1.56}/C$) were analyzed to consist of $RuSe_2$ pyrite (PDF# 65-3328) and Ruhcp (PDF# 65-1863) phases. The changes in the intensity of the $RuSe_2$ and Ru peaks suggest that the $RuSe_2$ content increased with increasing Se content.

TEST EXAMPLE 3

Energy Dispersive X-ray Spectroscopy (EDS) Analysis

Figure 3:
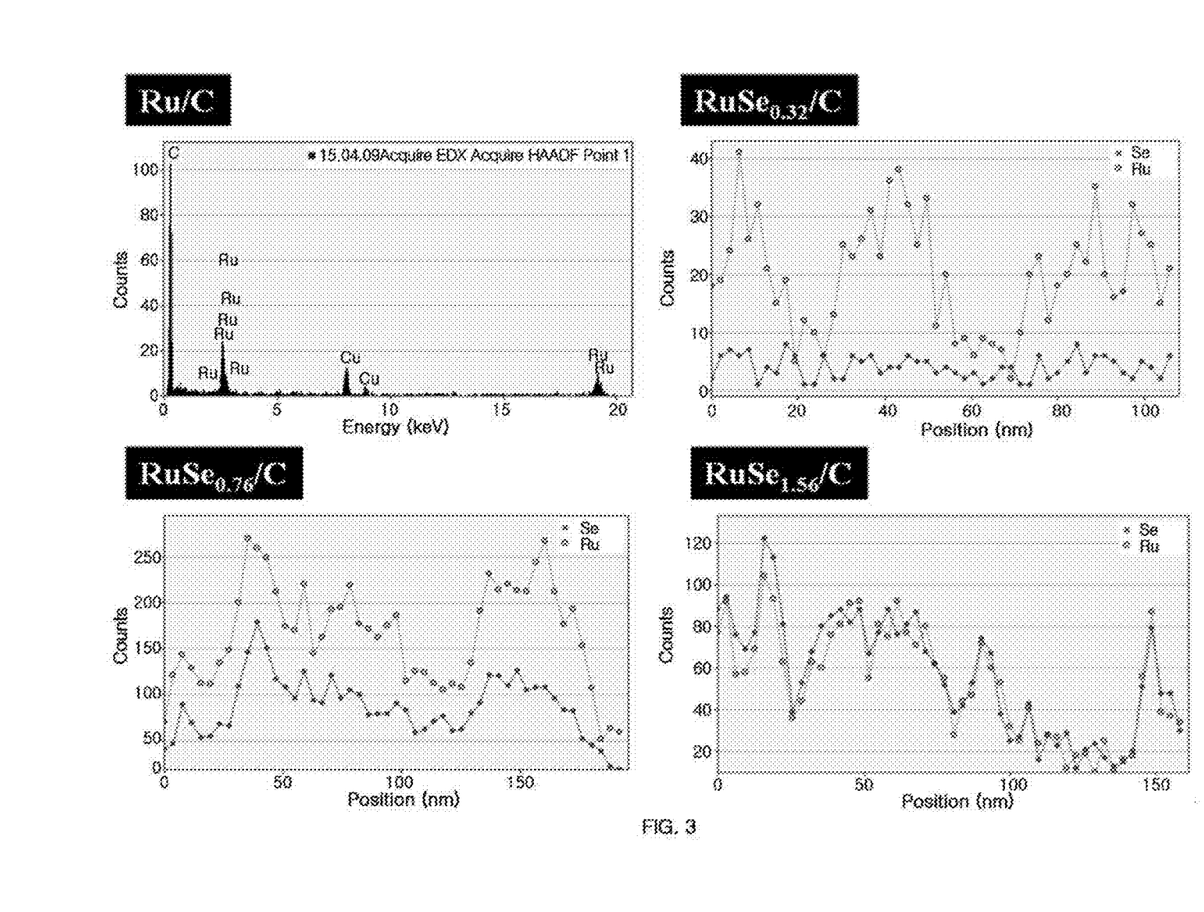
FIG. 3 shows the results of energy dispersive X-ray spectroscopy (EDS) for the compositions of complex catalyst particles produced in Examples 1 to 3 and Comparative Example 1.

The compositions of the complex catalyst particles were analyzed by EDS. The results are shown in FIG. 3. For $RuSe_{1.56}/C$, the signals of Ru and Se had substantially the same patterns, leading to the conclusion that the two elements were well mixed at the atomic level. As the Se content decreased, the signals of Se were decreased relative to those of Ru.

TEST EXAMPLE 4

X-ray Photoelectron Spectroscopy (XPS) Analysis

The atomic proportions of the complex catalysts of Examples 1-3 and Comparative Example 1 were observed by XPS. The results are shown in Table 1.

TABLE 1

| | Atomic proportion (%) | |
| --- | --- | --- |
| Catalyst | Ru | Se |
| Ru/C | 100 | 0 |
| $RuSe_{0.32}/C$ | 75.8 | 24.2 |
| $RuSe_{0.76}/C$ | 56.8 | 43.2 |
| $RuSe_{1.56}/C$ | 39.1 | 60.9 |

The results in Table 1 suggest that the constituent elements of the catalysts of Examples 1-3 and Comparative Example 1 were uniformly mixed in preferred ratios and forms.

TEST EXAMPLE 5

Cyclic Voltammetry (CV) Analysis

Figure 4:
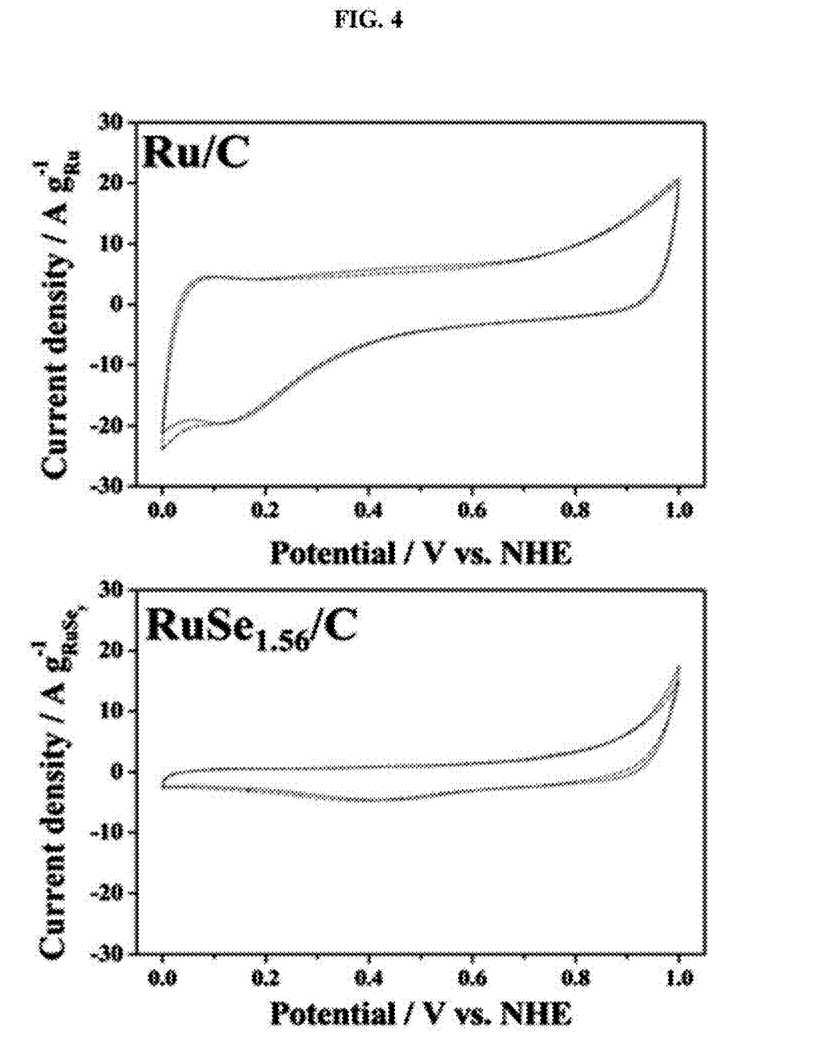
FIG. 4 shows phosphoric acid poisoning effects in half cell experiments using a complex catalyst of Example 6 and Comparative Example 2, as measured by cyclic voltammetry.

As shown in FIG. 4, the CV results of Ru/C show that an oxidation peak corresponding to the adsorption of phosphoric acid was observed in the potential range of 0.4-0.6 V. In contrast, no peak arising from electrochemical adsorption of phosphoric acid was present in $RuSe_{1.56}$/C. From the results, it can he seen that $RuSe_{1.56}$/C was not affected by adsorption of phosphoric acid.

TEST EXAMPLE 6

Analysis of Oxygen Reduction Polarization Curves

Figure 5:
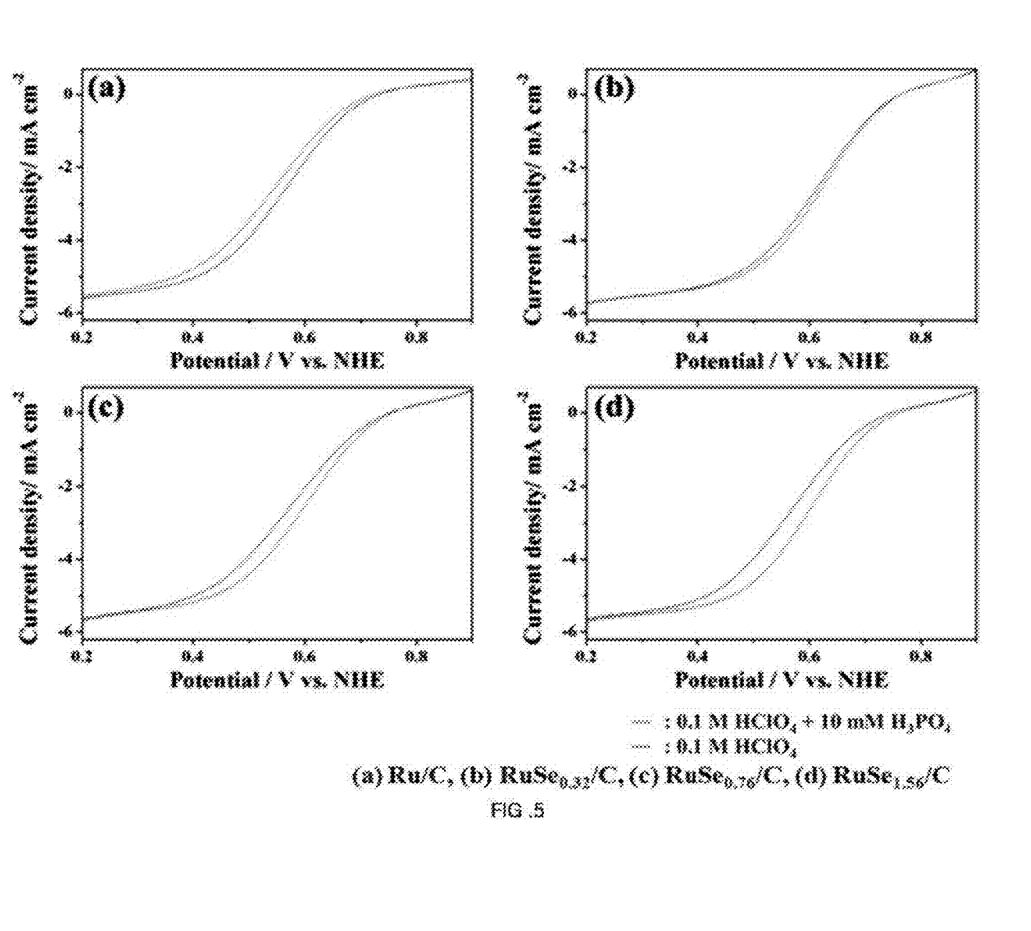
FIG. 5 shows phosphoric acid poisoning effects in half cell experiments using a complex catalyst of Examples 4 to 6 and Comparative Example 2, which were determined by measuring oxygen reduction polarization curves.

When an oxygen reduction polarization curve is moved to the right, overpotential is low. As can be seen from FIG. 5, the addition of phosphoric acid to Ru/C caused an increase in overpotential, but the addition of phosphoric acid to $RuSe_y$/C caused a decrease in overpotential. These results show that the addition of phosphoric acid promotes oxygen reduction in $RuSe_y$/C.

TEST EXAMPLE 7

Current Density and Half-Wave Potential Analysis

TABLE 2

| | $I_k$ (0.6 V/mAg$_{Ru_xSe_y}^{-1}$) | |
| --- | --- | --- |
| Current density ($I_k$) | 0.1M HClO$_4$ | 0.1M HClO$_4$ + 10 mM H$_3$PO$_4$ |
| Ru/C | 2.61 | 1.91 |
| RuSe$_{0.32}$/C | 4.67 | 5.50 |
| RuSe$_{0.76}$/C | 2.15 | 3.08 |
| RuSe$_{2.56}$/C | 1.63 | 2.66 |

After the addition of phosphoric acid, the current density per unit weight decreased (−26.8%) in Ru/C and increased (17.7-63.2%) in $RuSe_y$/C. These results show that the addition of phosphoric acid promotes oxygen reduction in $RuSe_y$/C.

TABLE 3

| | $E_{1/2}$ (mV) | | |
| --- | --- | --- | --- |
| Half-wave potential ($E_{1/2}$) | 0.1M HClO$_4$ | 0.1M HClO$_4$ + 10 mM H$_3$PO$_4$ | $E_{1/2,w/PA} - E_{1/2,w/oPA}$ |
| Ru/C | 551 | 529 | −22 |
| RuSe$_{0.32}$/C | 598 | 609 | +19 |
| RuSe$_{0.76}$/C | 556 | 583 | +27 |
| RuSe$_{1.56}$/C | 555 | 589 | +34 |

As shown in Table 3, the half-wave potential of the Ru/C catalyst was decreased by 22 mV after the addition of phosphoric acid. The decreased half-wave potential indicates an increase in the over-potential of oxygen reduction, implying a decrease in catalytic activity. In contrast, the half-wave potentials of the complex catalysts $RuSe_y$/C were increased by 19-34 mV in the presence of phosphoric acid, indicating a decrease of over-potential for oxygen reduction, i.e. an increase in the activity of the catalysts.

TEST EXAMPLE 8

X-Ray Absorption Spectroscopy (XAS) Analysis

Figure 6:
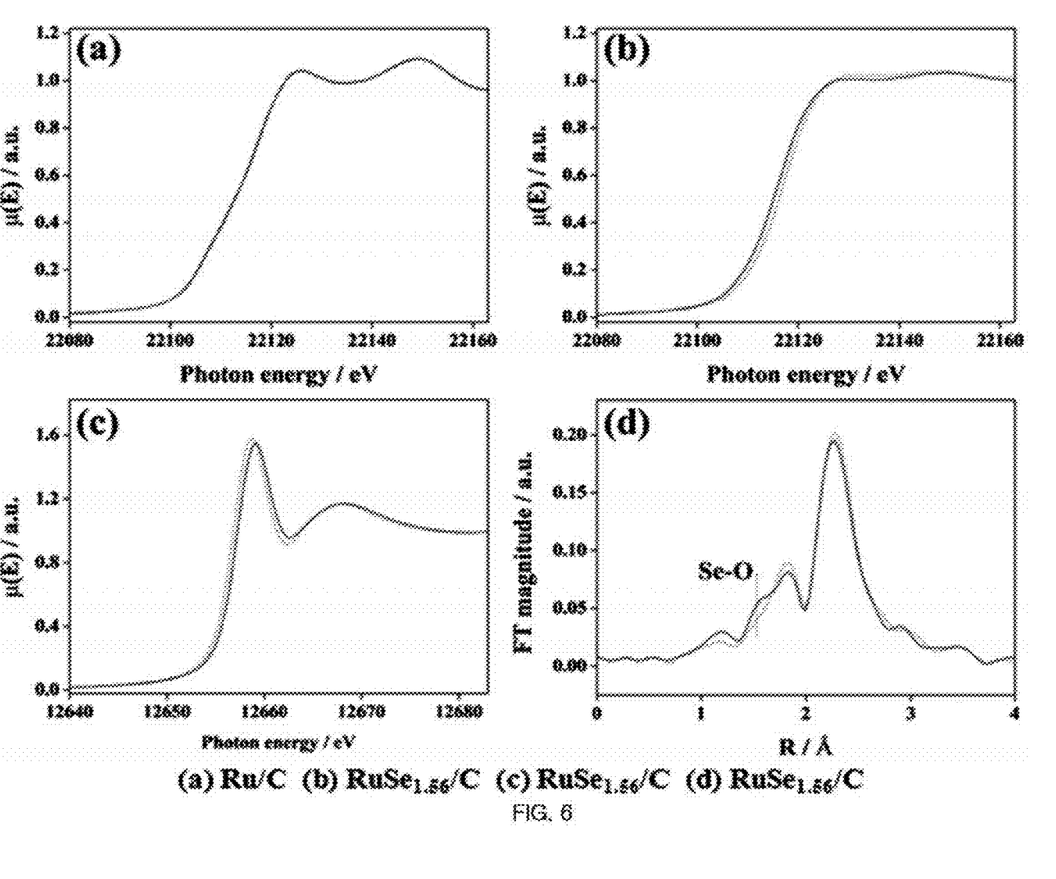
FIG. 6 shows phosphoric acid poisoning effects in half cell experiments using a complex catalyst of Examples 4 to 6 and Comparative Example 2, as measured by X-ray absorption spectroscopy.

As shown in FIG. 6a, the adsorption of phosphoric acid to Ru/C caused no substantial change in the oxidation state of Ru. The increased activity of $RuSe_{1.56}$/C by phosphoric acid appears to be because the adsorption of phosphoric acid to Selowers the binding energy of Ru—O.

The oxidation number of Ru was decreased by the addition of phosphoric acid to $RuSe_{1.56}$/C (in FIG. 6b, the X-ray absorption energy shifted to the lower level). This shows that the decreased binding energy of Ru—O is responsible for the increased activity for oxygen reduction.

In FIG. 6c, the shift of the X-ray absorption energy of Se K edge to the higher level upon the addition of phosphoric acid suggests an increase in the oxidation number of Se. FIG. 6d suggests an increase in the number of Se—O bonds. These results demonstrate the adsorption of phosphoric acid to Se.

In conclusion, in the PEMFC of the present invention, phosphoric acid escaping from the membrane is preferentially adsorbed to the chalcogen element of the complex catalyst. The adsorbed phosphoric acid further enhances the oxygen reduction catalytic activity of the metal. It is at least obvious that the catalytic performance of the metal acting as a catalytically active site is not hindered by the preferential adsorption of phosphoric acid. Therefore, the PEMFC of the present invention exhibits excellent characteristics in terms of power generation efficiency, durability, and lifetime without being affected by phosphoric acid poisoning.

What is claimed is:

1. A polymer electrolyte membrane fuel cell comprising a phosphoric acid-doped polyimidazole electrolyte membrane and a complex cathode catalyst,
   wherein the complex cathode catalyst comprises a carbon carrier and a mixture of ruthenium and a chalcogen element supported on the carbon carrier,
   wherein the phosphoric acid-doped polyimidazole is phosphoric-doped polybenzimidazole (PBI/PA), and
   wherein the ruthenium and the chalcogen element are present in an atomic ratio of 1:1.50 to 1:1.60.

2. A polymer electrolyte membrane fuel cell comprising a phosphoric acid-doped polyimidazole electrolyte membrane and a complex cathode catalyst,
   wherein the complex cathode catalyst comprises a carbon carrier and a mixture of ruthenium and a chalcogen element supported on the carbon carrier,
   wherein the phosphoric acid-doped polyimidazole is phosphoric-doped polybenzimidazole (PBI/PA), and
   wherein the complex cathode catalyst shows a 17 to 64% increase in oxygen reduction catalytic activity after being adsorbed by phosphoric acid.

* * * * *